United States Patent
Hawker et al.

(10) Patent No.: US 7,797,025 B2
(45) Date of Patent: *Sep. 14, 2010

(54) MICROPHONE COUPLER FOR A COMMUNICATION DEVICE

(75) Inventors: Larry Hawker, Waterloo (CA); George Mankaruse, Kitchener (CA); Robert Phillips, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 641 days.

This patent is subject to a terminal disclaimer.

(21) Appl. No.: 11/763,945

(22) Filed: Jun. 15, 2007

(65) Prior Publication Data

US 2007/0238495 A1    Oct. 11, 2007

Related U.S. Application Data

(63) Continuation of application No. 11/167,095, filed on Jun. 28, 2005, now Pat. No. 7,280,855.

(51) Int. Cl.
*H04M 1/00* (2006.01)
*H04B 1/38* (2006.01)

(52) U.S. Cl. .................. 455/575.1; 455/90.1; 455/575.5

(58) Field of Classification Search ................ 455/90.1, 455/575.1, 575.5, 575.8; 381/355, 365, 361, 381/375
See application file for complete search history.

(56) References Cited

U.S. PATENT DOCUMENTS

| | | | |
|---|---|---|---|
| 4,379,211 A | 4/1983 | Joscelyn et al. | |
| 4,857,668 A | 8/1989 | Buonanno | |
| 5,343,523 A * | 8/1994 | Bartlett et al. | 379/430 |
| 5,937,361 A * | 8/1999 | Smith | 455/575.1 |
| 6,051,779 A | 4/2000 | Gammon | |
| 6,148,089 A * | 11/2000 | Akino | 381/356 |
| 6,220,892 B1 * | 4/2001 | Bishop | 439/500 |
| 6,796,811 B1 * | 9/2004 | Pupkiewicz et al. | 439/86 |
| 7,400,875 B2 * | 7/2008 | Konno, Hideaki | 455/349 |
| 7,627,132 B2 * | 12/2009 | Anderson | 381/356 |

FOREIGN PATENT DOCUMENTS

| | | |
|---|---|---|
| EP | 0856977 | 8/1998 |
| JP | 06078040 | 3/1994 |
| JP | 2001-503921 | 3/2001 |
| JP | 2004-207807 | 7/2004 |
| WO | WO-89/04106 | 5/1989 |

* cited by examiner

*Primary Examiner*—Sonny Trinh
(74) *Attorney, Agent, or Firm*—McCarthy Tétrault LLP

(57) ABSTRACT

The invention provides a communication device comprising: a cover; a printed circuit board; a microphone on the printed circuit board; an antenna located at least in part within the cover; and a RF shield can shaped to fit over the microphone about the PCB. In the device, the cover is shaped to enclose the PCB and the RF shield can. The cover provides pressure on the RF shield can to press inward on the microphone to fixedly attach it to the PCB.

18 Claims, 7 Drawing Sheets

MICROPHONE COUPLER FOR A COMMUNICATION DEVICE

RELATED APPLICATION

This is a continuation application of U.S. patent application Ser. No. 11/167,095 filed Jun. 28, 2005, now U.S. Pat. No. 7,280,855 issued on Oct. 9, 2007.

FIELD OF INVENTION

The invention relates to a microphone coupler for a voice communication device, in particular a coupler providing an air channel from the exterior of the device to a microphone located within the device.

BACKGROUND

In a voice communication device, a microphone and a speaker must be provided in order to allow a user to send and receive audio signals with another compatible device used by another person.

In a typical telephone, a handset is provided which is a shaped form having two transducers, e.g. a microphone and a speaker, positioned in a well-spaced relationship. Meanwhile, portable communication devices, such as cellular phones, have smaller and smaller form factors. Locating transducers in a cellular phone is a difficult task, because there are space restrictions on potential locations for the transducers and in certain confined spaces, the location of a transducer, such as a microphone, must be sufficiently isolated from signal interference generated from other devices within the phone.

There is a need for an arrangement which addresses such difficulties in the prior art.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

Figure 1:
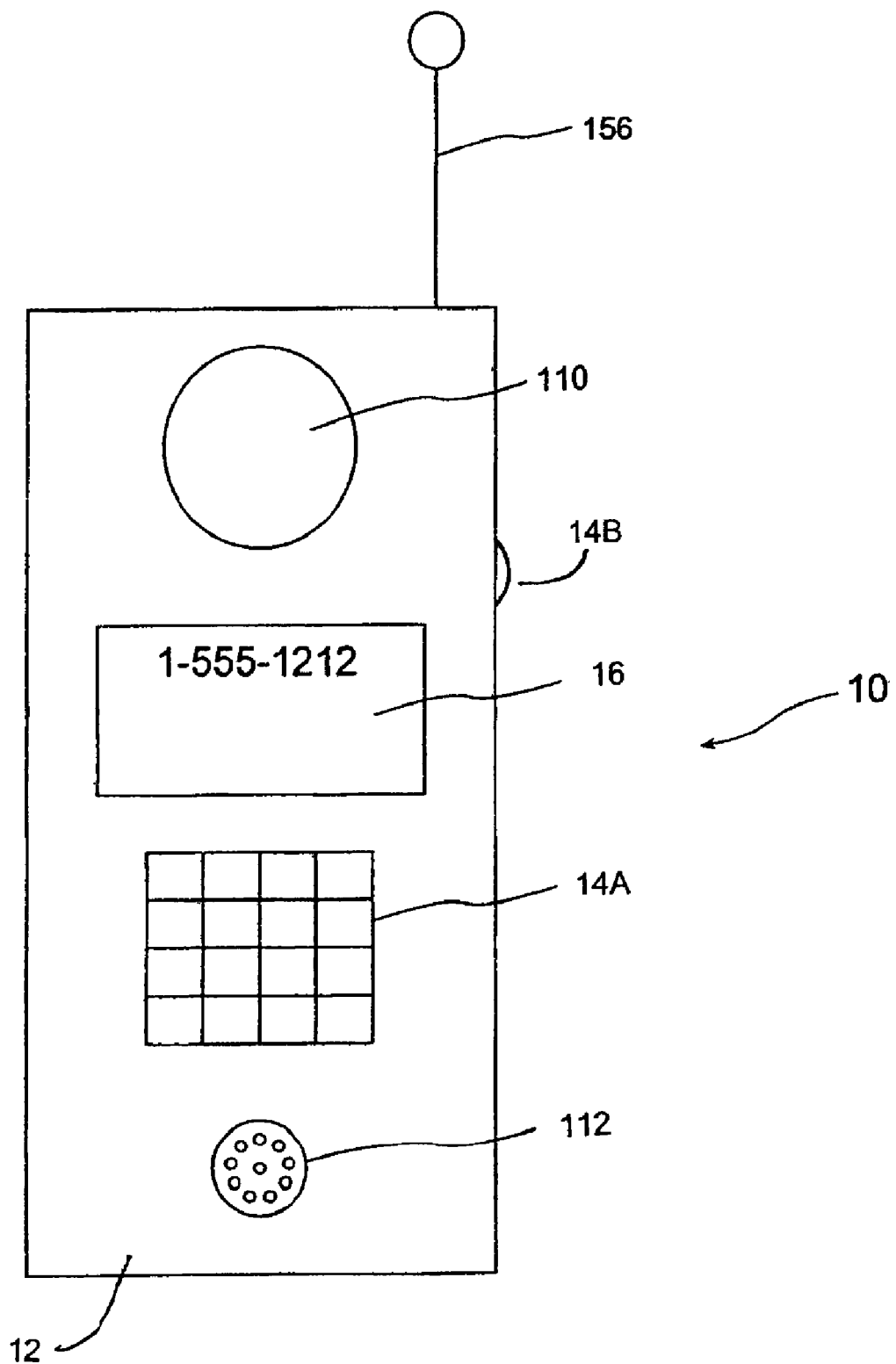
FIG. 1 is a block diagram of a communication device incorporating various embodiments of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In a first aspect, a communication device is provided. The device comprises: a printed circuit board (PCB) having a circuit for a microphone; the microphone; and a RF shield can shaped to fit over the microphone about the PCB. In the device, the shield is fixedly attached to the PCB above the microphone and the shield can is biased towards the microphone to hold the microphone in place.

The device may further comprise a cover shaped to enclose the PCB and the RF shield can, wherein the cover provides pressure on the RF shield can to press down on the microphone to fix it in place on the PCB.

In the device, the cover may further comprise an internal cavity defined by a set of walls, wherein the cavity is shaped to receive the shield can.

In the device, the set of walls may be lined with a metallized material.

The device may further comprise: a RF gasket shaped to contact a bottom edge of the shield can and the PCB. The gasket may be located between the PCB and the shield can and may be electrically conductive. An electrical connection in the PCB may be provided contacting the RF gasket to complete a ground path for the RF shield can, which goes through the gasket to the ground path.

The device may further comprise a microphone boot fitted to cover one of the microphone and the RF gasket.

The device may further comprise a Helmholtz cavity located in a space defined immediately below the cover.

In a second aspect a communication device is provided. The device comprises: a cover; a printed circuit board; a microphone on the printed circuit board; an antenna located at least in part within the cover; and a RF shield can shaped to fit over the microphone about the PCB. In the device, the cover is shaped to enclose the PCB and the RF shield can and to provide pressure on the RF shield can to fixedly attach the RF shield can and the microphone to the PCB.

In the device, the cover may further comprise an internal cavity defined by a set of walls, where the cavity is shaped to receive the shield can.

In the device, the set of walls may be lined with a metallized material.

The device may further comprise: a RF gasket shaped to contact a bottom edge of the shield can and the PCB. The gasket may be located between the PCB and the shield can and may be electrically conductive. An electrical connection in the PCB may be provided contacting the RF gasket to complete a ground path for the RF shield can, which goes through the gasket to the ground path.

The device may further comprise a microphone boot fitted to cover one of the microphone and the RF gasket.

In other aspects various combinations of sets and subsets of the above aspects are provided.

FIG. 1 schematically illustrates a handheld mobile communication device 10 and its components, including a cover 12, an input device (e.g. keyboard 14A or thumbwheel 14B) and an output device (a display 16), which is preferably a graphic Liquid Crystal Display (LCD), although other types of output devices may alternatively be utilized. Typically, cover 12 is a molded polycarbonate structure and may be formed via known plastic forming techniques. To assist in assembly of device 10, cover 12 typically comprises two or more pieces which fit together in a fitted arrangement to enclose the internal devices and form an exterior casing for device 10. For example, cover 12 may comprise an upper cover (12A) and a lower cover (12B). Physically for device 10, cover 12 may be elongated vertically, or may take on other sizes and shapes (including clamshell cover structures). As device 10 is a communication device, it has a speaker 110 and microphone 112 as components connected and controlled by electronic circuits and software within device 10 to provide a final aural communication interface with communications received by device 10, such as a telephone call.

Figure 2:
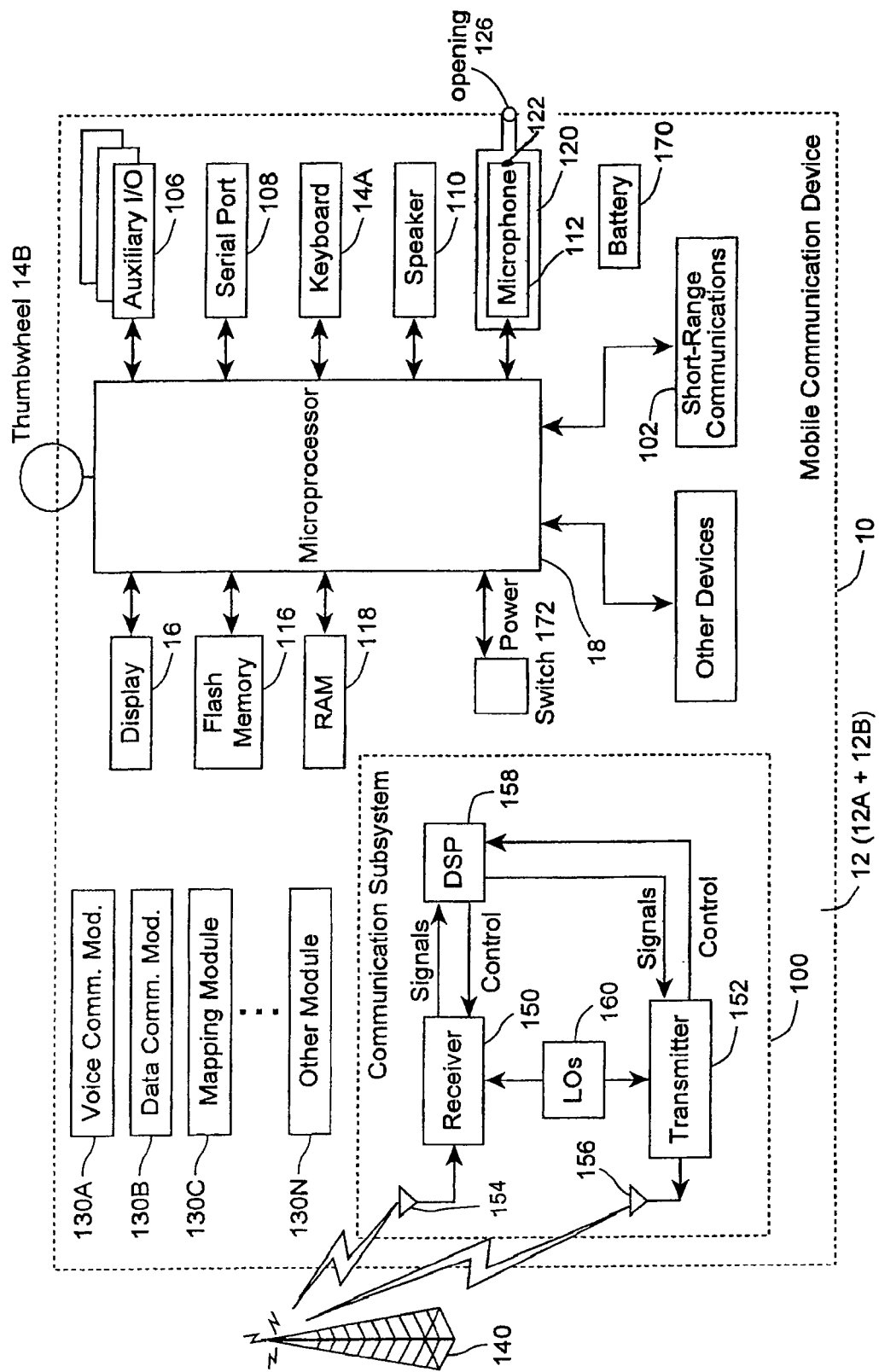
FIG. 2 is a block diagram of internal components of the communication device of FIG. 1, including a microphone and a microphone coupler.

Referring to FIG. 2, operating elements of device 10 are shown. A central data processing element in device 10 is microprocessor 18, which is shown as being coupled between keyboard 14A, thumbwheel 14B, display 16 and a series of other internal devices. For the purposes of the description, the term keypad and keyboard refers to both the exterior mechanical exposed key elements and the underlying switch and activation elements (e.g. elastomers, domes and contact regions). The microprocessor 18 controls the operation of the display 16, as well as the overall operation of the device 10, in response to actuation of keys on the keyboard 14A or thumbwheel 14B by a user. Exemplary microprocessors which may be used for microprocessor 18 include Data 950 (trade-mark) series microprocessors and the 6200 series microprocessor, both available from Intel Corporation.

In addition to the microprocessor 18, other internal devices of the device 10 are shown schematically. These devices include: a communication subsystem 100, a short-range communication subsystem 102, a set of auxiliary I/O devices 106, a serial port 108, a speaker 110 and a microphone 112. Memory for device 10 is provided in flash memory 116 and Random Access Memory (RAM) 118. Internal devices are enclosed within cover 12 and typically are either mounted onto a printed circuit board (PCB), affixed to an interior part of the cover or suspended by some means within cover 12. Radio frequency (RF) shield can 120 provides a protective chamber for microphone 112 to extraneous RF signals.

The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as an other software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. PIM application is also preferably capable of sending and receiving data items via a wireless network 140.

Communication functions, including data and voice communications, are performed through the communication subsystem 100, and possibly through the short-range communication subsystem 102. Communication subsystem 100 includes receiver 150, transmitter 152 and one or more antennae, illustrated as receive antenna 154 and transmit antenna 156 (which are typically combined into a single antenna). In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice networks, both separate and integrated, may also be utilized with device 10. It will be appreciated that some signals received and transmitted through the subsystem 100 may provide interfering signals with other components in device 10, such as microphone 112.

Network access requirements vary depending upon the type of communication system which can communicate with device 10. For example, in the Mobitex (trade-mark) and DataTAC (trade-mark) networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, device 10 may send and receive communication signals over communication network 140. Signals received from communication network 140 by the receive antenna 154 are routed to receiver 150, which provides for signal amplification, frequency down conversion, filtering, channel selection, etc., and may also provide analog to digital conversion. Analog-to-digital conversion of received signals allows the DSP 158 to perform more complex communication functions, such as signal demodulation and decoding. In a similar manner, signals to be transmitted to network 140 are processed (e.g., modulated and encoded) by DSP 158 and are then provided to transmitter 152 for digital to analog conversion, frequency up conversion, filtering, amplification and transmission to communication network 140 (or networks) via the transmit antenna 156.

In addition to processing communication signals, DSP 158 provides for control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is input to microprocessor 18. The received signal is then further processed by microprocessor 18 for an output to the display 16, or alternatively to some other auxiliary I/O devices 106. A device user may also compose data items, such as e-mail messages, using keyboard (keypad) 14A, thumb-wheel 14B and/or some other auxiliary I/O device 106, such as a touchpad, a rocker switch or some other type of input device. The composed data items may then be transmitted over communication network 140 via communication subsystem 100.

In a voice communication mode, overall operation of device 10 is substantially similar to the data communication mode, except that received signals are output to speaker 110, and received audio signals are provided to microphone 112 for further conversion into an electrical signal and further processing by device 10. Microphone 112 is preferably an electret condenser microphone (ECM), but any type of microphone may be used which can be mounted to PCB 104 (shown in FIG. 3), including a silicon-based transducer.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. Power switch 172 provides a separate on/off switch for device 10.

Figure 3:
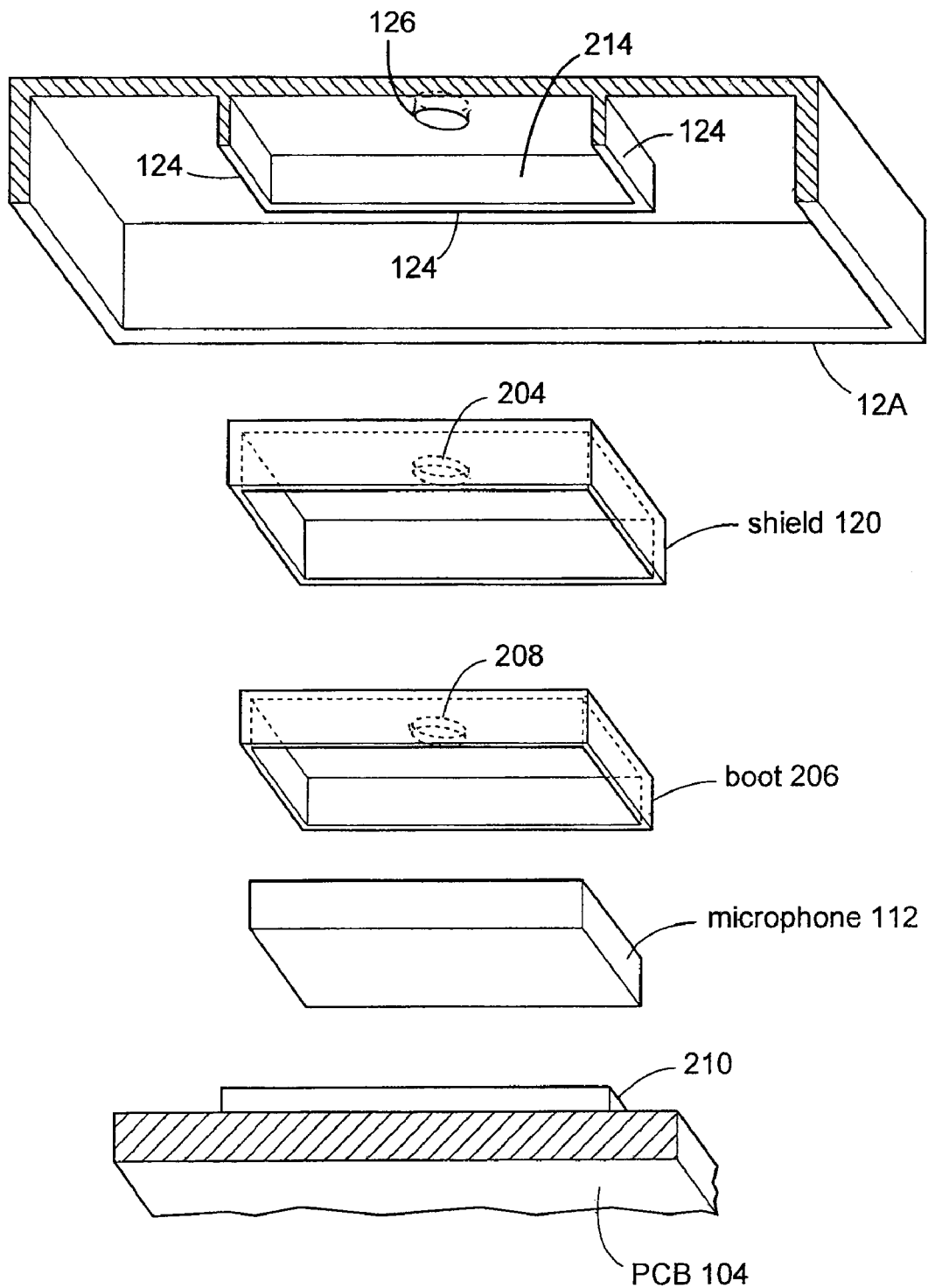
FIG. 3 is an exploded upper perspective view of aspects of the microphone coupler and its surrounding components of a first embodiment related to the device of FIG. 1.
Figure 4:
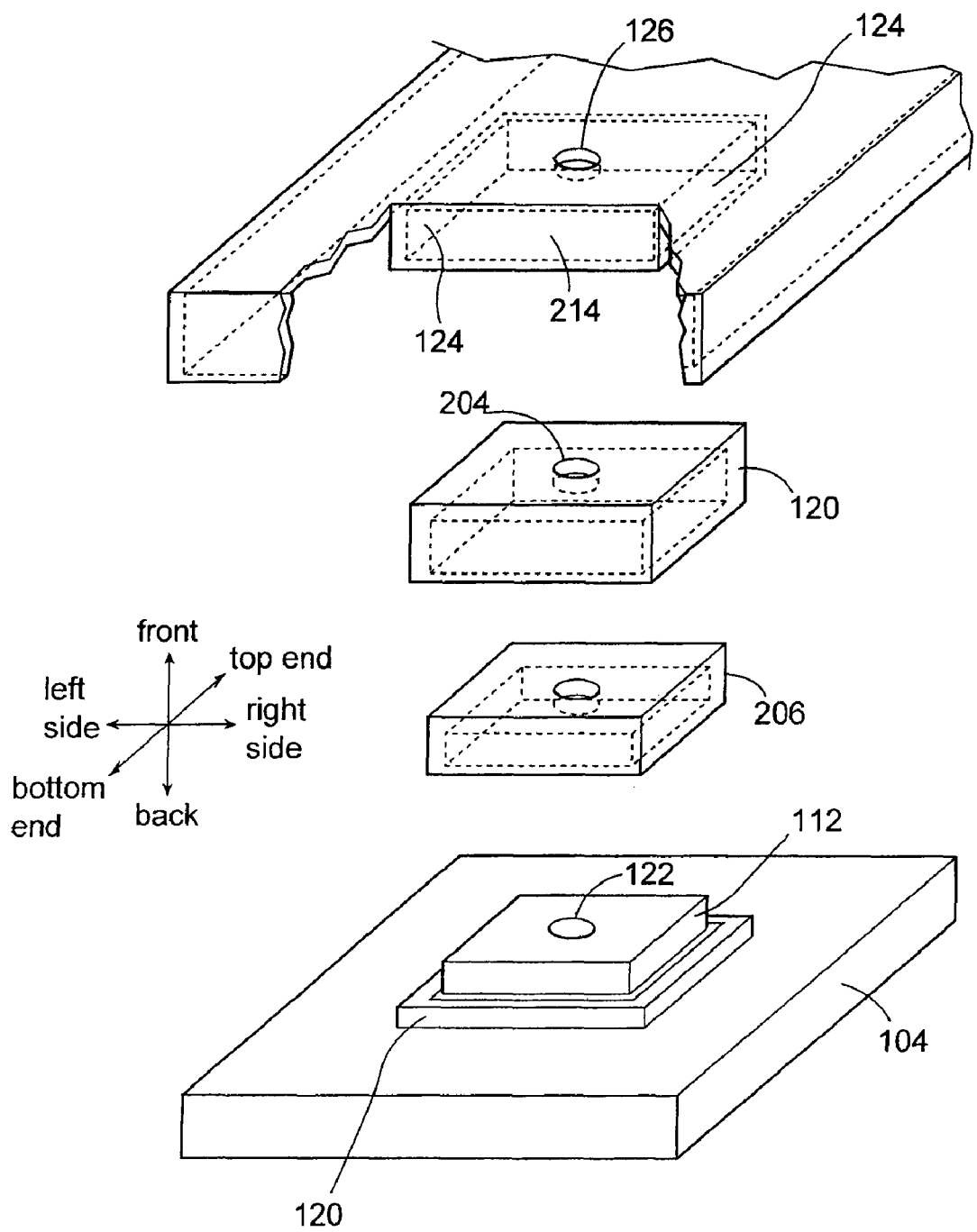
FIG. 4 is an exploded lower cut-off perspective view of aspects of the microphone coupler and its surrounding components of the first implementation of the device of FIG. 2.
Figure 5:
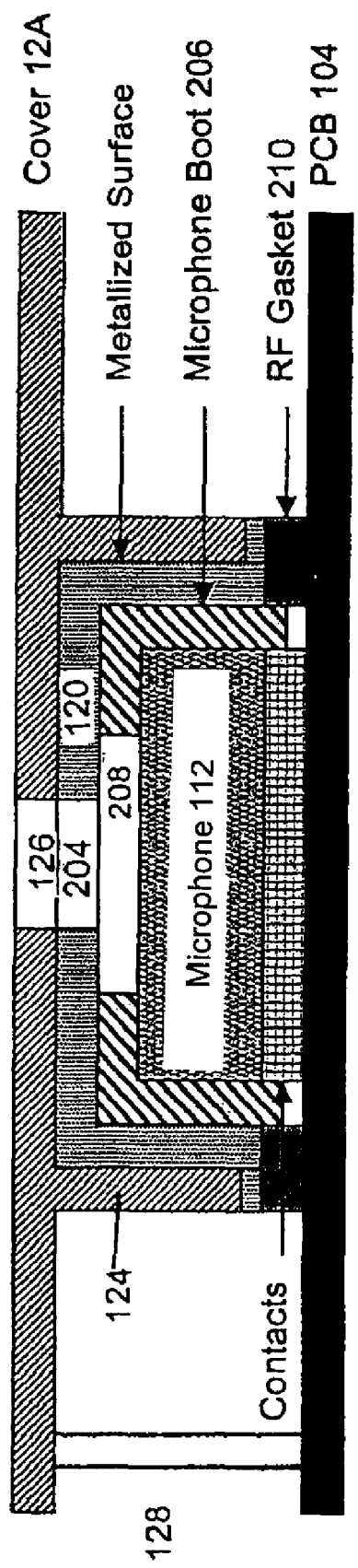
FIG. 5 is side cross-section view of the microphone and its surrounding components of the implementation of FIG. 2.

FIGS. 3, 4 and 5 provide further detail on aspects of cover 12 and internal devices of device 10. For the purposes of illustration, references to front side, back side, left side, right side, and top and bottom ends are provided using the orientation markings relative to PCB 104 as shown in FIG. 4. Therein, the front side of the PCB is the front facing side having display 16 mounted thereto. It will be appreciated that the term "top" may be used interchangeably the "front" side and the "top" end of device 10 and similarly that the term "bottom" may be used interchangeably the "back" side and the "bottom" end of device 10. The relative positions will be clear in the context of the use of the terms. These references provide relative positional references for components for convenience only and are not meant to be limiting, unless otherwise noted.

PCB 104 provides a substrate for mounting and supporting the internal devices on both of its top and bottom sides and provides some electrical circuitry for the devices, as defined by etchings within the layers of plastic and copper. As such, devices can be more densely packed thereon, thereby reducing the size of PCB 104. PCB 104 is securely mountable within cover 12, typically via screws. PCB 104 is a generally planar sandwich of layers of plastic (or FR4) and copper. Microphone 112 is shown generally as an oblong casing having aperture 122 on its top allowing ambient aural signals to be received there through and to be processed and converted by its internal components into an electrical signal. Typically, there are at least two electrical contacts for microphone 112 which are generally located on its bottom side of its casing. Corresponding contact pads are located on PCB 104 to separately engage the contacts and complete an electrical circuit to which can be used by other elements within device 10. In other embodiments, microphone 112 may be implemented having a cylinder shaped case.

Certain physical and operational restrictions may affect the location of devices on PCB 104 and to their placement on a particular side thereof. For example, a conventional industrial exterior design of device 10 has keypads on its top surface, thereby requiring that the electrical components relating to the keypad be placed on the top side of PCB 104. Similarly, microphone 112 can be sensitive to interference signals from antennae 154 and/or 156. As such, it is preferable to locate microphone 112 as far away as possible from antennae 154 and 156. In one design layout, at least one of antennae 154 and 156 is located on the bottom of PCB 104 in the bottom part of device 10. To assist in isolating microphone 112 from interference from such antennae 154 and/or antenna 156, microphone 112 is located as far away as possible from such antennae; however, design and spacing restrictions may force the placement of microphone 112 to be closer to such antennae than preferred (at least for RF interference reasons).

To further assist in shielding microphone 112, radio frequency (RF) shield can 120 is provided to cover microphone 112 on PCB 104. Shield can 120 provides an electromagnetic shield to isolate microphone 112 from electromagnetic interference. Such interference may originate from signals received and generated by either antenna 154 or 156. Shield can 120 has aperture 204 therein to allow audio signals entering opening 126 to ultimately enter shield can 120 and be provided to microphone 112. The size and shape of aperture 204 may be designed to meet acoustic and shielding requirements as needed. In particular, the size should be sufficiently small to still provide effective RF shielding, but sufficiently large to allow acoustic signals to pass into its interior to reach microphone 112. In one embodiment, aperture 204 is round and has a diameter of approximately 1 to 2 mm. Shield can 120 is preferably made of metal and is shaped to completely enclose microphone 112, but for aperture 204, when microphone 112 is mounted onto PCB 104. In the embodiment it has a thickness of approximately 0.2 mm, although other thicknesses can be employed. Shield can 120 is oblong in shape, but any suitable shape may be used which can cover microphone 112. At the bottom edge of shield can 120, a laterally extending flange may be provided to create a larger gasket area for placement tolerance and more reliable electrical contact. Microphone boot 206 is provided as a spacer between shield can 120 and microphone 112. It is made of a compressible, non-conductive material, like rubber and is a generally thin covering shaped to cover enough of the body of microphone 112 to prohibit or impede contact between microphone 112 and shield can 120. Boot 206 does not necessarily have to cover all contact points between microphone 112 and shield can 120. Boot 206 also provides acoustic sealing and vibration isolation for microphone 112. Boot 206 has an aperture 208 on its upper surface which is in approximate alignment with apertures 204 and 122, thereby allowing any ambient sound signals to pass through boot 206 and reach microphone 112. The various apertures may be shaped and sized to provide placement of the external port away from the microphone itself to further enhance microphone placement with respect to the antennae location and the resulting RF interference, provided a clear path is provided for the ambient sound to reach microphone 112. This may also provide flexibility in location and size of external hole 126 in cover 12.

In the embodiment, microphone 112 may be soldered or fixed to PCB 104. In other embodiments, microphone 112 may be held in place on PCB 104 using a friction fit of boot 206, can 120 and elements of cover 12A. On PCB 104, RF gasket 210 is provided on its surface and surrounds the location footprint of microphone 112 on PCB 104. It defines a perimeter around the footprint which aligns with the boundary defined by bottom edge of shield can 120. As such, shield can 120 rests on top of gasket 210 when in place. In order to provide an RF seal, gasket 210 is preferably conductive and as such, may be made from a conductive material like GS 8000. PCB 104 may have at least one exposed contact pad underneath the perimeter of gasket 210 to provide an electrical connection with gasket 210 and shield can 120 to an electrical circuit in PCB 104. The circuit may simply be a connection to an interior ground plane in PCB 104 to assist in the RF shielding.

In the interior of cover 12A, walls 124 descend vertically inward from the interior ceiling of cover 12A to define interior cavity 214, which is shaped to provide a snug fit around a part (or even all) of RF shield can 120 and to assist in aligning can 120 above microphone 112. In the present embodiment, there are four walls 124 which are located on each side of rectangular microphone 112. In other embodiments, other arrangements of size and number of walls (e.g. two or three walls) may be provided. Although they are connected in the shown embodiment, they may not necessarily be connected. In other embodiments, corner sections may be provided which descend from the interior ceiling. Aperture 126 in cover 12A in the top surface of cavity 214 allows audible signals to enter from the outside environment of device 10 to its interior and microphone 112. It will be appreciated that other physical wall-like structures may be provided within cover 12A and/or PCB 104 to align shield can 120 about microphone 112. To assist in the shielding of microphone 112 from unwanted RF signals the exposed surface of cavity may be coated with a metallized material.

To assemble the relevant components, microphone 112 is placed in its final position with its connections aligning with the corresponding pads on PCB 102. As noted earlier, microphone 112 is typically not soldered onto PCB 102. Boot 206 is fitted over microphone 112. Then shield can 120 is fitted over boot 206. Shield can 120, boot 206 and microphone 112 may be assembled together in whole or in part prior to insertion on PCB 102. When cover 12A is fitted in place with cover 12B over PCB 102, interior cavity 214 contacts the top surface of shield can 120. The dimensions and shapes of PCB 102, covers 12A and 12B, shield can 120, boot 206, gasket 210 and microphone 112 are defined such that cover 12A presses inward on shield can 120 which compresses boot 206 which provides inward pressure on microphone 112, thereby providing an inward friction fit for microphone 112 onto PCB 104 into its intended position about its contact pads. A fastening means, such as screw 128, provide a tight binding mechanism to keep cover 12A and 12B locked together with all elements appropriately secured within, in place. Alternatively, a set of engageable latches and hooks may be provided among the covers 12A and 12B and PCB 102 to provide a snap-fit arrangement of the pieces. Although they are not shown, antennae 154 and 156 are typically located at one end of PCB 102.

As shown in FIG. 5, the lateral width of gasket 210 is wide enough to support the bottom edge of shield can 120, including its bottom flange. Walls 124 are positioned to fit relatively tightly over shield can 120 and extend to abut against the top surface of the exposed bottom flange of can 120. It will be appreciated that in other embodiments, the physical interface between elements may have different shapes and abutments. When all elements are assembled, all apertures 126, 204 and 208 are in approximate alignment allowing audible signals to travel from the outside of device 10 to microphone 112.

Figure 6:
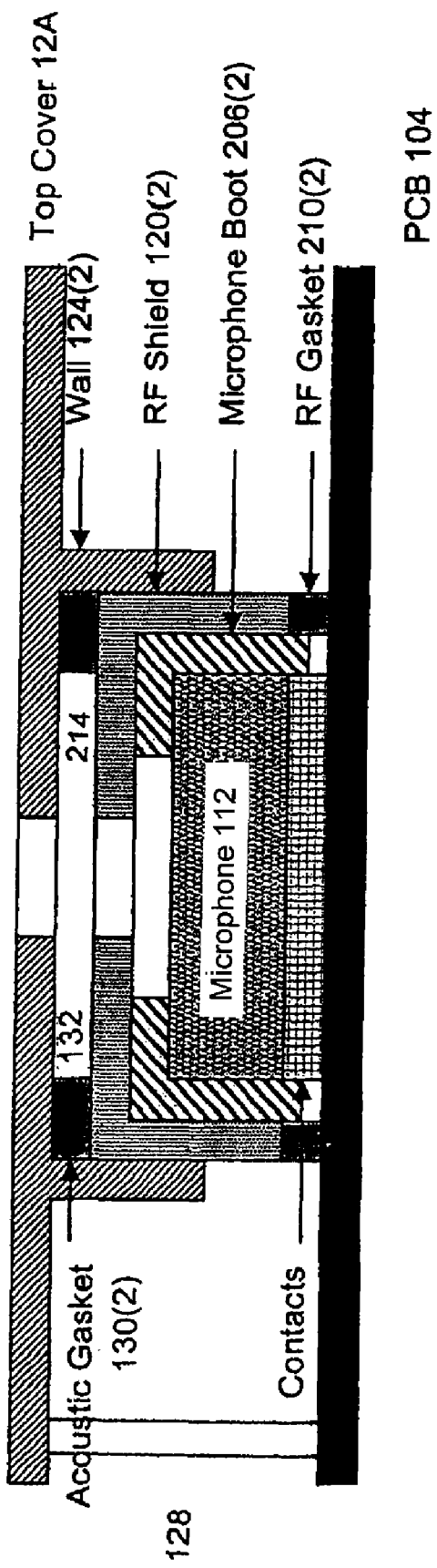
FIG. 6 is side cross-section view of a microphone and its surrounding components of a second embodiment related to the device of FIG. 1.

Referring to FIG. 6, another embodiment is shown where an additional gasket 130(2) is provided between the top of RF shield can 120(2) and the inner surface of interior cavity 214. The footprint of gasket 130(2) is shaped to have a larger open area for its aperture 132 than the corresponding apertures for the other elements. As such, the shape and size of aperture 132 can be varied to provide different Helmholtz resonators by the space bounded by the lateral edges of aperture 132, the bottom of the interior cover of cover 12A(2) and the top of shield can 120(2). One use of the resonator is to provide pre-emphasis to high frequency signals received through aperture 132. For calculation purposes, one or both of the other apertures may be considered to be part of the resonator. To assist in fixing elements in place, the top and bottom of gasket 130 may have an adhesive applied thereto to assist in affixing it to its neighbour. Gasket 210(2) is shaped to align with the straight bottom of shield can 120(2). The walls 124(2) do not extend fully inward such that they abut against either PCB 102 or RF gasket 210(2). In other embodiments, other shapes can be defined for the differing elements.

Figure 7:
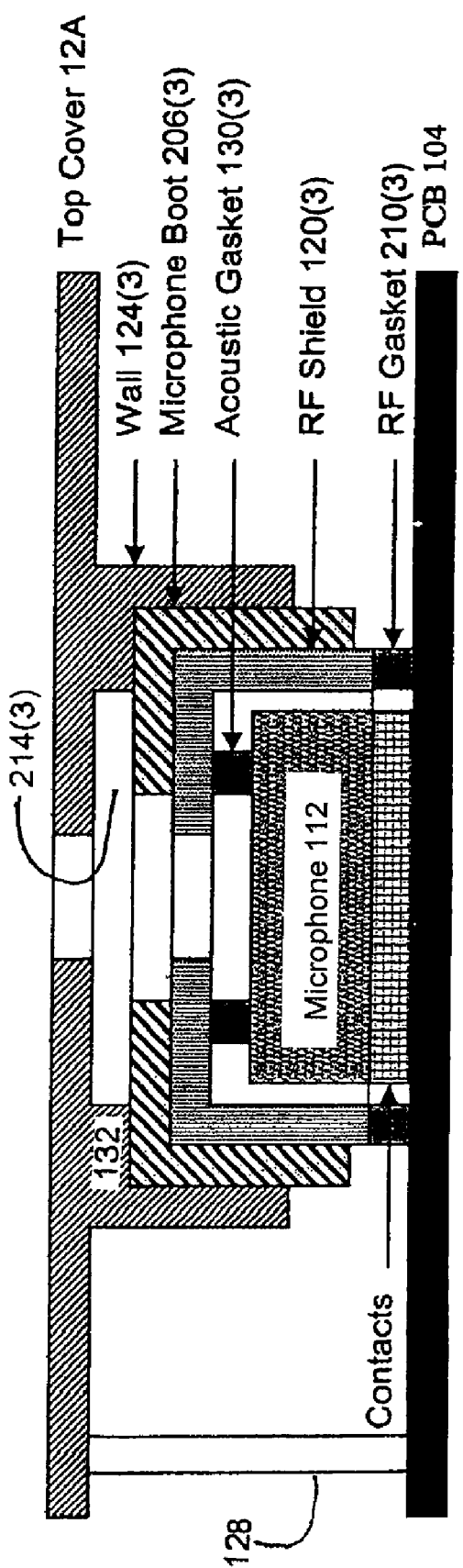
FIG. 7 is side cross-section view of a microphone and its surrounding components of a third embodiment related to the device of FIG. 1.

It will be appreciated that in other embodiments, one or more of the above components may be modified in their sizes and shapes to meet specific operational requirements. Also, the order of arrangement of the components can be modified. For example, referring to FIG. 7, a further embodiment is shown where RF shield can 120(3) is placed underneath boot 206(3). Gasket 130(3) is located between the upper surface of microphone 112 and the ceiling of RF shield can 120(3). Interior cavity 214(3) is defined to have additional spacers 132 on the exterior perimeter of its area to provide additional space in cavity 214(3) underneath cover 12A. Cavity 214(3) defines a Helmholtz cavity in a similar manner as described above.

It will be appreciated that one feature of the embodiments is a system which allows microphones to be mounted onto a PCB and be shielded from RF signals without necessarily having to solder the microphones to the PCB. It is biased inward or held in place by a fastener. As noted, one method of securing the shield to the PCB is to use a friction fit between the PCB and the cover of the device. However, in other embodiments, other devices or techniques may be used to impart inward friction or pressure onto the shield. For example, a RF shield can may be provided with latches or receptacles for latches that engage with corresponding elements on the PCB or the lower cover to secure the shield in place. Also, the shield may be held down with screws secured into the PCB. It will be appreciated that there are other securing techniques which could be used that do not involve soldering.

In other embodiments, a microphone and a shield can may be placed on the back side of a PCB of device 10. Therein, a back cover for device 10 is provided with an appropriate interior cavity (similar to one described above) to impart an inward, upward pressure on the shield can to press it against the PCB and the microphone to hold the microphone in place. It will be seen that such embodiments operate in a similar manner to embodiments described above, but for relevant components being placed on the back side of the PCB and mounting and alignment features being provided in the back cover for device 10.

Although the invention has been described with reference to certain specific embodiments, various modifications thereof will be apparent to those skilled in the art without departing from the scope of the invention as outlined in the claims appended hereto.

The invention claimed is:

1. A communication device comprising:
   a printed circuit board (PCB) having a conductive pad;
   a microphone having a cylindrical body;
   a RF shield can shaped to fit over the cylindrical body of the microphone having an opening for sound to reach the microphone; and
   a cover shaped to enclose the PCB and the RF shield can, the cover positioned to press on the microphone to fix the microphone in position on the conductive pad on the PCB and having an internal cavity defined by a set of walls, the cavity shaped to receive the RF shield can to hold the RF shield can in place over the microphone.

2. The communication device as claimed in claim 1, wherein the cavity defined in the cover is shaped to snugly receive the cylindrical body.

3. The communication device as claimed in claim 1, wherein the set of walls are lined with a metallized material making contact with the RF shield can.

4. The communication device as claimed in claim 1, further comprising:
   a RF gasket shaped to contact a bottom edge of the RF shield can, the gasket being located between the PCB and the RF shield can; and
   an electrical connection in the PCB contacting the RF gasket to complete a ground path for the RF shield can to a ground connection in the PCB.

5. The communication device as claimed in claim 1, further comprising:
   a microphone boot fitted to cover one of the microphone and the RF shield can.

6. The communication device as claimed in claim 5, further comprising a gasket located in the space between the cover and the boot.

7. The communication device as claimed in claim 1, further comprising:
   a Helmholtz cavity located above the microphone.

8. The communication device as claimed in claim 7, wherein the Helmholtz cavity is defined by a space located immediately underneath the cover.

9. The communication device as claimed in claim 1, further comprising a gasket located on a surface of the microphone having the opening and between the surface and the RF shield.

10. A communication device comprising:
    a printed circuit board (PCB) having a conductive pad;
    a microphone having an oblong body located on the printed circuit board;
    a RF shield can providing an RF shield, the RF shield can shaped to fit snugly over the oblong body of the microphone having an opening for sound to reach the microphone;
    a cover shaped to enclose the PCB and the RF shield can, the cover positioned to press on the microphone to fix the microphone in position on the conductive pad on the PCB and having an internal cavity defined by a set of walls, the cavity shaped to receive the RF shield can to hold the RF shield can in place over the microphone; and
    an antenna located at least in part within the cover.

11. The communication device as claimed in claim 10, wherein the cover further comprises:
    an internal cavity defined by a set of walls, the cavity shaped to snugly receive the RF shield can.

12. The communication device as claimed in claim 11, wherein the set of walls are lined with a metallized material.

13. The communication device as claimed in claim 10, further comprising:
    a RF gasket shaped to contact a bottom edge of the RF shield can, the gasket being located between the PCB and the RF shield can; and
    an electrical connection in the PCB contacting the RF gasket to complete a ground path for the RF shield can to a ground connection in the PCB.

14. The communication device as claimed in claim 13, further comprising:
    a microphone boot fitted to cover one of the microphone and the RF shield can.

15. The communication device as claimed in claim 14, further comprising a gasket located in the space between the cover and the boot.

16. The communication device as claimed in claim 10, further comprising:
    a Helmholtz cavity located in a space located immediately below the cover.

17. The communication device as claimed in claim 10, wherein the RF shield can is metallic.

18. The communication device as claimed in claim 10, further comprising a gasket located on a surface of the microphone having the opening and between the surface and the RF shield.

* * * * *